(No Model.)
C. V. DASEY.
TOOL FOR REPAIRING PNEUMATIC TIRES.
No. 600,142. Patented Mar. 8, 1898.
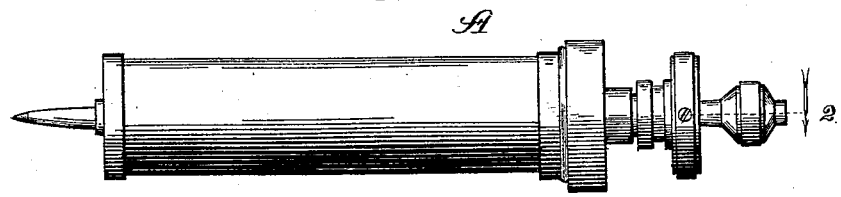
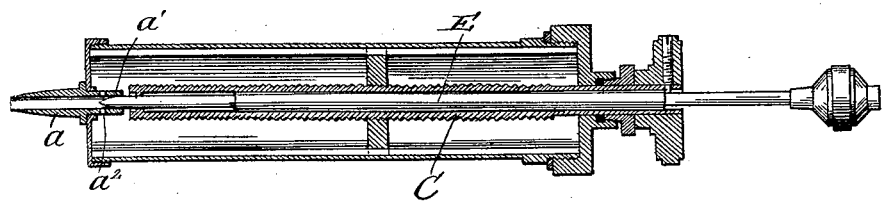
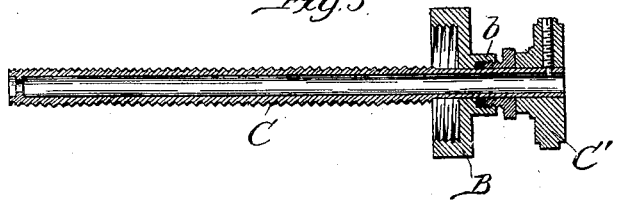
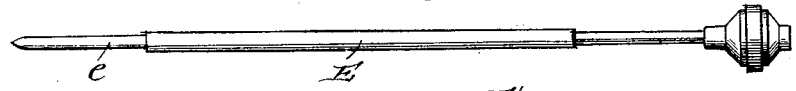
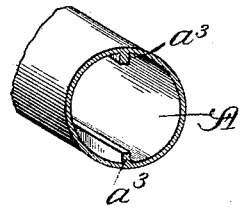
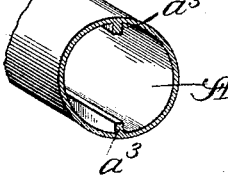
Witnesses:
Inventor:
Clarence Vincent Dasey,
By Banning & Banning & Sheridan
Attys.

UNITED STATES PATENT OFFICE.

CLARENCE VINCENT DASEY, OF DENVER, COLORADO.

TOOL FOR REPAIRING PNEUMATIC TIRES.

SPECIFICATION forming part of Letters Patent No. 600,142, dated March 8, 1898.

Application filed April 8, 1897. Serial No. 631,200. (No model.)

*To all whom it may concern:*

Be it known that I, CLARENCE VINCENT DASEY, a citizen of the United States, residing at Denver, in the county of Arapahoe and State of Colorado, have invented certain new and useful Improvements in Tools for Repairing Pneumatic Tires, of which the following is a specification.

The object of my invention is to provide a simple, economical, and efficient tool for repairing pneumatic tires; and the invention consists in the features, combinations, and details of construction hereinafter described and claimed.

In the accompanying drawings, Figure 1 is a side elevation of a complete tool constructed in accordance with my improvements; Fig. 2, a longitudinal sectional view of the same, taken on line 2 of Fig. 1; Fig. 3, a longitudinal sectional view of the feed-screw, cylinder-head, and thumb-screw removed from the other parts; Fig. 4, a view of the puncturing guiding-needle; Fig. 5, a perspective view of the movable plunger, and Fig. 6 a perspective view of a portion of the cylinder.

In the art to which this invention relates it is well known that pneumatic tires are susceptible of being punctured or perforated during their use and that it is desirable to have an apparatus or tool for repairing the puncture quickly—one that can be readily carried and that can be depended upon in emergencies. The principal object of my invention, therefore, is to provide a tool possessing these advantages.

In constructing a tool in accordance with my improvements I provide a cylindrical receptacle A of the desired size, which is provided with a tubular projection $a$ at one end. This tubular portion projects into the interior part of the cylinder, as at $a'$, where it is provided with lateral perforations $a^2$. The cylinder is further provided with a removable head portion B, carrying a stuffing-box $b$, that forms the principal bearing portion for the rotatable hollow feed-screw C. When closed, this cylindrical receptacle is adapted to contain a quantity of rubber cement or rubber in a thick pasty solution, which is adapted to dry very quickly and mend a puncture or perforation in the rubber tire or piece of rubber. In order to feed this rubber cement forward and out through the tubular projection of the cylindrical receptacle, I provide a longitudinally-movable piston or plunger D, which is prevented from having a rotary motion by having the notches $d$ on its periphery engage with longitudinal lugs $a^3$ on the inner portion of the tube. This movable plunger is provided with a threaded opening $d'$, that engages with the threaded outer portion of the feed-screw C, upon which it is mounted. It will be noticed that the feed-screw is prevented from having a longitudinal movement by having its shoulder portion or a collar $c$ abut against the cylinder-head and its thumb-screw $c'$ abut closely against the thumb-screw of the stuffing-box, leaving just play enough for an easy rotation. The arrangement of the parts is such that the screw has a rotary movement only and is prevented from longitudinal movement, while the plunger has a longitudinal movement only and is prevented from rotating laterally or in a rotary manner, this arrangement acting to provide a compact and efficient tool.

In order to enlarge the puncture and provide for the ready insertion of the tubular projection of the cylinder, it is necessary to provide a guiding-needle E. This needle has an enlarged central portion E' and reduced end portions $e$, which act to permit the needle to have a longitudinally-reciprocating motion in the tubular feed-screw, so that it may be pushed forward, as shown in Fig. 1, for insertion into a tire and withdrawn, as shown in the sectional view, Fig. 2, so that only a small portion of its point rests in the tubular projection, and while permitting a supply of liquid cement to be forced through the tubular projection into the tire it provides an inner bearing to steady the inner end of the feed-screw.

In operation the cement is applied to the interior of the cylinder and the screw, with its guiding-needle, inserted in position. This places the cement between the front side of the cylinder and the inner side of the movable plunger. By pushing the guiding-needle so that its point projects beyond the tubular projection it may be inserted through the perforation in the tire. The needle is then withdrawn and the thumb-screw c' rotated, which action rotates the feed-screw, moves the movable plunger forward, and forces a quantity of the liquid cement out through the tubular projection into the tire and around the perforation. The tool is then withdrawn and the cement allowed to dry.

The advantages of this style of construction are such that the tool is very compact, taking up no more room when in use than when not in use. Further, the guiding-needle cleans out the tube at all times, and the lateral perforations of the tubular projection, being arranged on the inside in contact with the liquid cement, are kept from cracking, which would happen if such lateral perforations were outside of the tool.

While I have described my invention with more or less minuteness as regards details and as being embodied in certain precise forms, I do not desire to be limited thereto unduly or any more than is pointed out in the claims. On the contrary, I contemplate all proper changes in form, construction, and arrangement, the omission of immaterial elements, and substitution of equivalents, as circumstances may suggest or render expedient.

I claim—

1. In a tool for repairing pneumatic tires, the combination of a cylindrical receptacle provided with a tubular projection and adapted to hold rubber cement in a liquid or pasty condition, a plunger longitudinally movably mounted therein and held against rotary or lateral movement for forcing the cement out of the tubular projection, a slot on one of such parts and a longitudinal rib or projection on the other and engaging with the slot for holding the plunger against rotary or lateral movements, and means for moving the plunger, substantially as described.

2. In a tool for repairing pneumatic tires, the combination of a cylindrical receptacle provided with an inner longitudinal rib or projection and with a tubular projection for holding cement in a liquid condition, a plunger provided with a longitudinal slot or groove engaging with the projection in the cylinder and longitudinally movably mounted in such receptacle for forcing out the liquid cement, a hollow tubular feed-screw rotatably mounted in the cylinder and prevented against longitudinal movement for moving the plunger, and a guiding-needle mounted in and extending through such hollow feed-screw, substantially as described.

3. In a tool for repairing pneumatic tires, the combination of a cylindrical receptacle provided with a tubular projection having lateral openings on its inner projecting portion, a hollow rotatable feed-screw mounted in such cylinder and prevented against longitudinal movement, a longitudinally-movable plunger mounted upon such feed-screw and adapted to be moved back and forth by the rotations of such feed-screw, a guiding-needle in such hollow feed-screw adapted to be moved back and forth in the tubular projection for the purpose of furnishing a perforating-point when in its outermost position and a guide or bearing for the inner end of the feed-screw when in its retracted position, and means for preventing the movable plunger from a rotary or lateral movement, substantially as described.

CLARENCE VINCENT DASEY.

Witnesses:
HENRY L. DOW,
STANLEY J. WILLSON.